US012052804B2

(12) United States Patent
Taleb

(10) Patent No.: US 12,052,804 B2
(45) Date of Patent: Jul. 30, 2024

(54) METHOD FOR OPERATING AN AUTOMOTIVE LIGHTING DEVICE AND AUTOMOTIVE LIGHTING DEVICE

(71) Applicant: VALEO VISION, Bobigny (FR)

(72) Inventor: Rabih Taleb, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/001,955

(22) PCT Filed: Jul. 15, 2021

(86) PCT No.: PCT/EP2021/069912
§ 371 (c)(1),
(2) Date: Dec. 15, 2022

(87) PCT Pub. No.: WO2022/017966
PCT Pub. Date: Jan. 27, 2022

(65) Prior Publication Data
US 2023/0225025 A1 Jul. 13, 2023

(30) Foreign Application Priority Data
Jul. 20, 2020 (FR) ...................................... 2007590

(51) Int. Cl.

| | |
|---|---|
| ***H05B 45/18*** | (2020.01) |
| ***H05B 45/56*** | (2020.01) |
| ***H05B 47/105*** | (2020.01) |
| *F21S 41/141* | (2018.01) |
| *F21S 45/10* | (2018.01) |

(52) U.S. Cl.
CPC ............. *H05B 45/18* (2020.01); *H05B 45/56* (2020.01); *H05B 47/105* (2020.01); *F21S 41/141* (2018.01); *F21S 45/10* (2018.01)

(58) Field of Classification Search
CPC ...... H05B 45/18; H05B 45/56; H05B 47/105; H05B 45/28; F21S 41/141; F21S 45/10
See application file for complete search history.

(56) References Cited

U.S. PATENT DOCUMENTS

2015/0069908 A1 3/2015 Fukui et al.
2017/0305328 A1* 10/2017 Kato ...................... H05B 45/56

OTHER PUBLICATIONS

European Patent Office, International Search Report and Written Opinion of corresponding International Application No. PCT/EP2021/069912, dated Oct. 18, 2021.

* cited by examiner

*Primary Examiner* — Renan Luque
(74) *Attorney, Agent, or Firm* — Valeo Vision

(57) ABSTRACT

The invention provides a method for operating an automotive lighting device including the providing a first preliminary current profile, calculating a first preliminary derating time associated to the first preliminary current profile, providing a second preliminary current profile, calculating a second preliminary derating time associated to the second preliminary current profile, feeding the first light module with a first current profile which provides a total amount of current lower than the first preliminary amount of current, and feeding the second light module with a second current profile which provides a total amount of current higher than the second preliminary amount of current.

15 Claims, 3 Drawing Sheets

METHOD FOR OPERATING AN AUTOMOTIVE LIGHTING DEVICE AND AUTOMOTIVE LIGHTING DEVICE

TECHNICAL FIELD

This invention is related to the field of automotive lighting devices, and more particularly, to the temperature control of these light sources comprised in these devices.

BACKGROUND OF THE INVENTION

Digital lighting devices are being increasingly adopted by car makers for middle and high market products.

These digital lighting devices usually comprise solid-state light sources, the operation of which heavily depends on temperature.

Temperature control in these elements is a very sensitive aspect, and is usually carried out by derating, which means decreasing the current value which feeds the light source so that the output flux and the operation temperature decreases accordingly. This causes that the performance of the light sources must be heavily oversized to face these overheating problems, so that the operation values may be decreased while still maintaining acceptable values.

Maintaining an optimal performance into a headlamp regardless the driving conditions is very difficult. Very often, one lighting module heats faster than others, thus penalizing the remainder lighting modules because of the high interior temperature of the HL. This phenomenon is not optimal because when a light module suffers derating, the rest of the modules are also affected to guarantee an acceptable homogeneity, despite the fact that they have not reached the derating threshold yet.

This problem has been assumed until now, but a solution therefor is provided.

SUMMARY OF THE INVENTION

The invention provides an alternative solution for managing the temperature of the light sources of an automotive lighting device by a method for operating an automotive lighting device according to the invention. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for operating an automotive lighting device comprising at least a first light module and a second light module, each one of the light modules comprising solid-state light sources, the method comprising the steps of:

providing a first preliminary current profile to feed the first light module so that the first light module produces a light flux greater than a first flux threshold value, calculating a first preliminary derating time associated to the first preliminary current profile, wherein the first preliminary current profile involves a first preliminary amount of current until the first preliminary derating time providing a second preliminary current profile to feed the second light module so that the second light module produces a light flux greater than a second flux threshold value calculating a second preliminary derating time associated to the second preliminary current profile, the second preliminary derating time being higher than the first preliminary derating time, wherein the second preliminary current profile involves a second preliminary amount of current until the second preliminary derating time;

feeding the first light module with a first current profile which provides a total amount of current lower than the first preliminary amount of current, calculated until the first preliminary derating time; and feeding the second light module with a second current profile which provides a total amount of current higher than the second preliminary amount of current, calculated until the second preliminary derating time.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

The fact that the calculated second preliminary derating time is higher than the first preliminary derating time means that the preliminary derating time is calculated for both light modules, and then the first light module is the one with a lower derating time and the second light module is the one with a higher derating time.

In the state of the art, the preliminary derating time of the first module will jeopardize the performance of the whole lighting device, since it causes the second lighting module to undergo the derating despite the second module would not still need it. However, in the method of the present invention, the derating time of the second light module is lower than the second preliminary derating time to cause an increase the derating time of the first light module. Hence, the global derating time is extended, obtaining a good performance during a longer time period maintaining the flux homogeneity.

In some particular embodiments, the first current profile and the second current profile comprises starting with a first current value and increasing the current value when a predetermined condition is reached.

With this approach, the first and second current profiles are optimized to provide the minimum current needed in each moment, having the ability of increasing the current if needed.

In some particular embodiments, the step of obtaining the first current value is carried out by a machine learning algorithm which obtains information from vehicle sensors.

The machine learning algorithm obtains information from different sensors of the vehicle and is trained and tested in different situations to obtain the maximum derating time for the less favourable light module.

This machine learning algorithm may be located in the cloud or embedded in the control unit of the vehicle.

In some particular embodiments, the vehicle sensors include at least some of temperature sensors, a vehicle speed sensor, a geopositioning sensor and radar or lidar sensors.

In some particular embodiments, the predetermined condition includes the fact that a measured luminous flux value falls below the corresponding flux threshold value.

The luminous flux value is an important parameter, although it is not the only one that provides information about the lighting device operation. Controlling the current value with the luminous flux ensures an acceptable operation of the sum of the lighting modules.

In some particular embodiments, the method further comprises the step of obtaining a light source temperature and wherein the predetermined condition includes the fact that the light source temperature reaches a predetermined value.

A different but compatible way of controlling the current is by means of the temperature, which may provide indirect data of luminous flux.

In some particular embodiments, the predetermined condition includes the fact that a time limit has been reached.

A different way of controlling the current is just by a timer, estimating the temperature evolution with time. In these cases, there is no need of measuring any data, and the current is automatically being increased. This may be done when a time pattern has been solidly established.

In some particular embodiments, the step of increasing the current value involves increasing the current value from a first value to a second value, the second value being greater than the first value but lower than 1.1 times the first value, particularly lower than 1.05 times the first value and particularly lower than 1.03 times the first value.

In these examples, the current may be increased in small ranges, so that the current value (and the temperature) are kept as low as possible within a range which provides an acceptable performance.

In some particular embodiments, the method further comprises the step of recording a sequence of current value increments for predetermined conditions.

This sequence may be useful if using a time-based pattern, to avoid a continuous temperature measurement.

In some particular embodiments, the first light module is a low beam module and the second light module is a high beam module. This has some synergistic effects, since the low beam and high beam modules are sometimes operated simultaneously.

In some particular embodiments, the steps of the method are applied to at least 10% of the light sources of the corresponding light module.

The progressive increase in the current value may be applied to a great number of light sources at the same time, for example, all the light sources providing a predetermined functionality. The power saving and homogeneous performance may therefore be applied to a great amount of elements.

In a second inventive aspect, the invention provides an automotive lighting device comprising:

- a first light module comprising a plurality of solid-state light sources;
- a second light module comprising a plurality of solid-state light sources;
- a control element for performing the steps of the method according to the first inventive aspect;

This lighting device provides the advantageous functionality of efficiently managing the performance of the light sources.

BRIEF DESCRIPTION OF DRAWINGS

In some particular embodiments, the automotive lighting device comprises further comprising a thermistor intended to measure the temperature of the solid-state light sources.

DETAILED DESCRIPTION OF THE INVENTION

Figure 1:
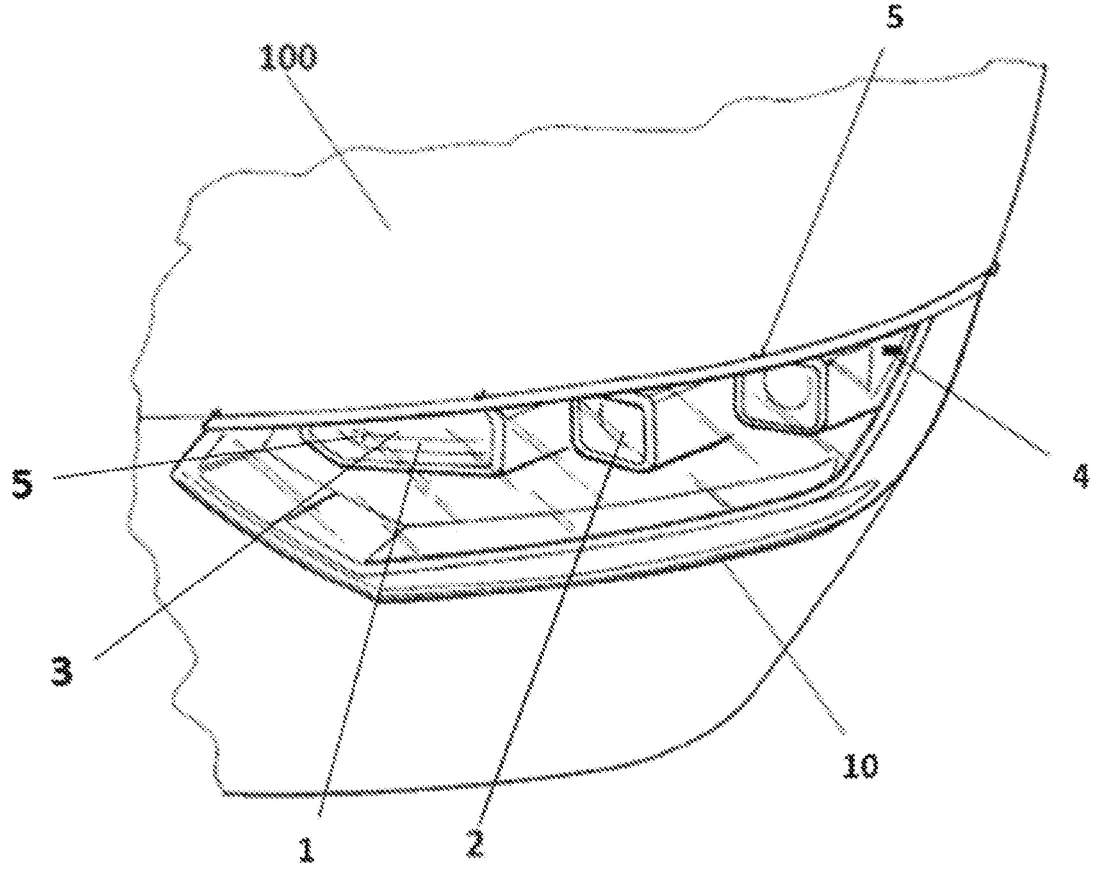
FIG. 1 shows a general perspective view of an automotive lighting device according to the invention.

In these figures, the following reference numbers have been used:

1 First light module
2 Second light module
3 LED
4 Control element
5 Thermistors
6 Temperature threshold
10 Lighting device
11 First preliminary curve for first module
11' Invention curve for the first module
12 First preliminary curve for second module
12' Invention curve for the second module
21 First preliminary derating time for first module
21' Invention derating time for the first light module
22 Second preliminary derating time for second module
22' Invention derating time for the second light module
31 Original curve of a state of the art method for the first light module
41 Curve of the invention for the first light module
51 Original curve of a state of the art method for the second light module
61 Curve of the invention for the second light module
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general perspective view of an automotive lighting device according to the invention.

This lighting device 10 is installed in an automotive vehicle 100 and comprises a first light module 1 comprising a plurality of LEDs 3;

a second light module 2 comprising a plurality of LEDs 3;

a control element 4;

a plurality of thermistors 5 intended to measure the temperature in different sections of the first and second light modules.

Each of the light modules is a high-resolution module, having a resolution greater than 2000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometre.

The monolithic matrix is coupled to the control centre so as to control the generation and/or the projection of a pixelated light beam by the matrix arrangement. The control centre is thus able to individually control the light emission of each pixel of the matrix arrangement.

Alternatively to what has been presented above, the matrix arrangement may comprise a main light source coupled to a matrix of mirrors. Thus, the pixelated light source is formed by the assembly of at least one main light source formed of at least one light emitting diode emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control center.

In different embodiments, the matrix arrangement may comprise a scanning laser system wherein a laser light source emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

Since there is a great amount of light sources very close to each other, thermal control is very important to ensure a good performance and efficiency.

Figure 2:
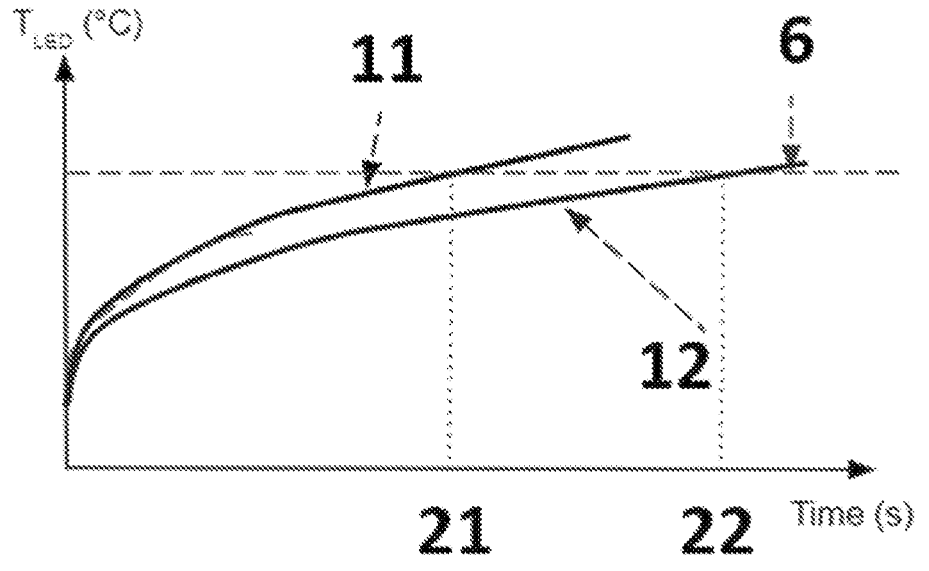
FIG. 2 shows a graphic scheme of the standard operation of the two light modules of the lighting device when no method according to the invention applies.

FIG. 2 shows a graphic scheme of the standard operation of the two light modules of the lighting device when no method according to the invention applies.

According to this figure, the first light module follows the first curve 11, increasing its temperature with time. When a first preliminary derating time 21 is reached, the first light module reaches the maximum temperature threshold 6 and needs to be derated to avoid damages.

Analogously, the second light module, if installed alone, would follow the second curve 12, increasing its temperature with time. When a second preliminary derating time 22 was reached, the second light module would have reached the maximum temperature threshold 6 and needs to be derated to avoid damages. The fact is that, since the second light module is installed together with the first light module, which has a lower derating time, the second light module would need to be derated at the first preliminary derating time, which happens before the second preliminary derating time, to guarantee the homogeneity of the beam and to respect the regulations, which does not allow the use of a high beam module without operating the low beam module.

Figure 3:
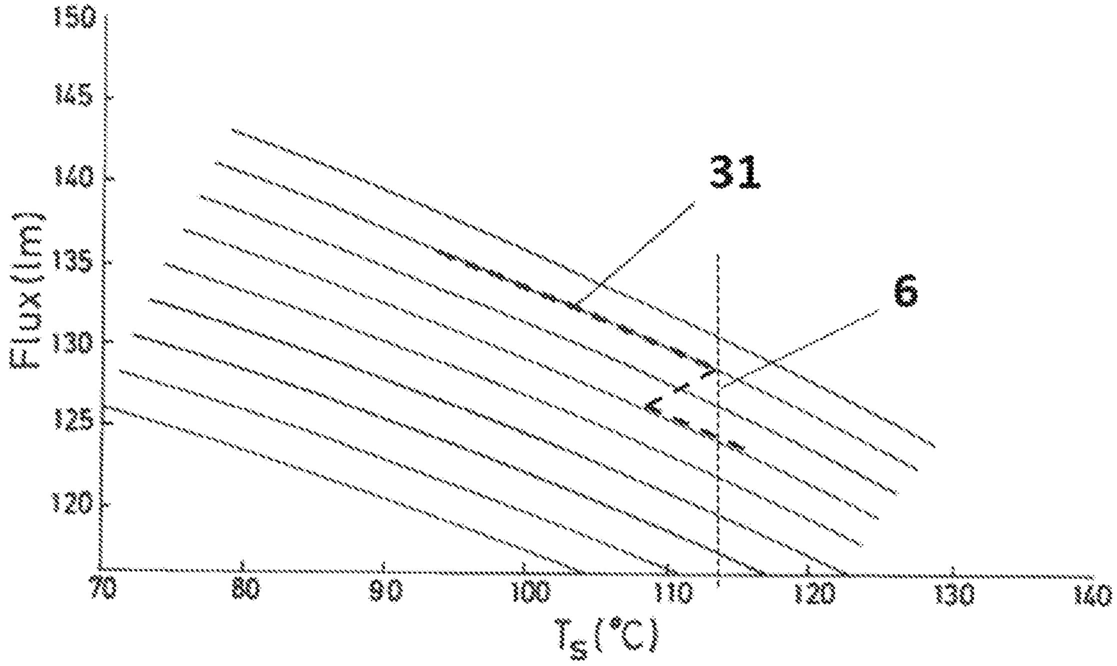
FIG. 3 shows a different graph for the same phenomenon, but applied only to the first light module.

FIG. 3 shows a different graph for the same phenomenon, but applied only to the first light module. In this graph, the luminous flux is shown against the temperature. While the temperature increases (which happens while the time increases), the light module will follow the curve 31 until reaching the temperature threshold 6, and will be derated to a lower intensity, which causes a lower luminous flux and a lower temperature. However, the temperature threshold is reached again, causing a new derating.

This first curve 31 defines a first preliminary amount of current until the first preliminary derating time and the second curve 12 defines a second preliminary amount of current until the second preliminary derating time.

Figure 4:
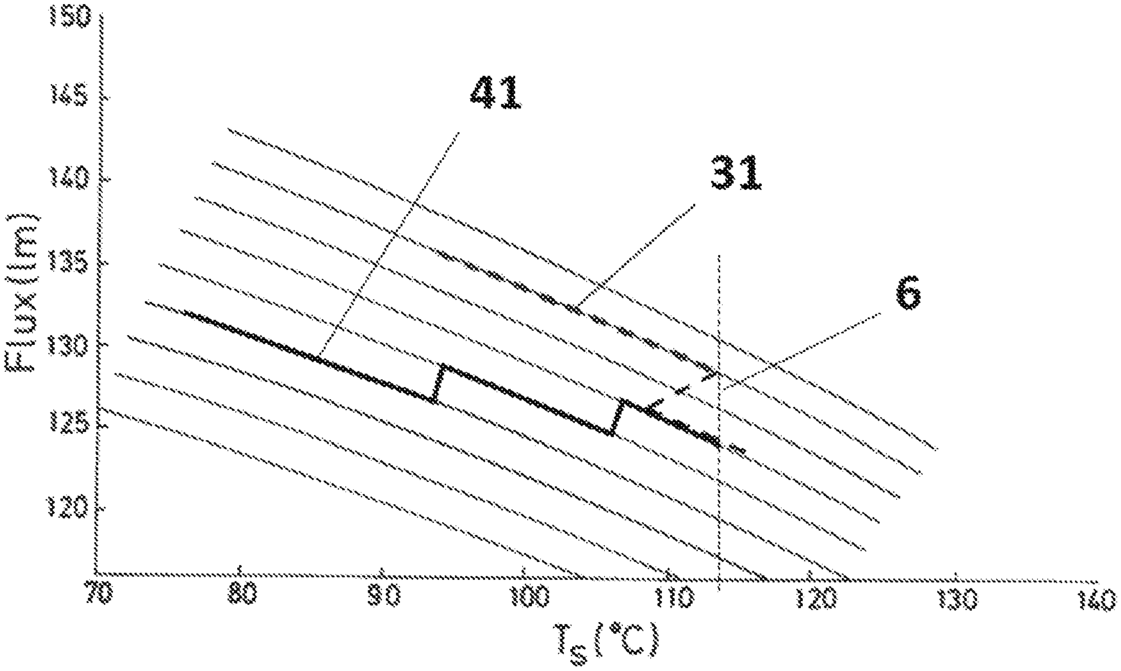
FIG. 4 shows the evolution of the flux-temperature curve of the first module when an operation according to the method of the invention is followed.

FIG. 4 shows the evolution of the flux-temperature curve 41 of the first module when an operation according to the method of the invention is followed.

Dashed lines are used for the preliminary current profile 31 of FIG. 2 (therefore, only for the first light module), for a better comparison between both methods.

The first light module is fed with a first current value which is lower than the corresponding first value of the first preliminary current profile of FIG. 2. This first current value is calculated by a machine learning algorithm which obtains information from vehicle sensors and is trained to provide a value which provides the longest derating time possible for first light module. This lower current value will provide a lower luminous flux. To compensate this difference in the luminous flux, and to provide a better flux homogeneity, as will be shown in FIG. 5, the second light module is fed with a first current value which is higher than the corresponding first value of the second preliminary current profile.

The increases in the current value of curve 41 are carried out from a first value to a second value, wherein the second value is slightly higher than the first value, typically between 1.01 and 1.05 times the first value. The current increase is low but enough to keep enough luminous flux for a longer period of time.

Since the first value of the second current profile is higher than expected, the sum of both fluxes will be compensated, and an acceptable value will be obtained. Therefore, the current value will be increased with time, when a low value of the total luminous flux (understood as the sum of the luminous flux of both first and second light modules) is achieved.

Figure 6:
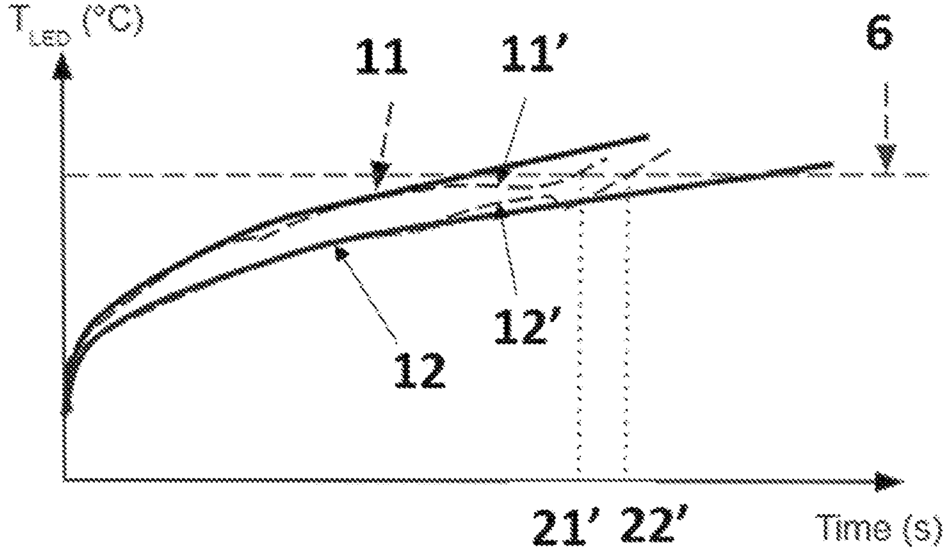
FIG. 6 shows the new graphic scheme of the operation of the two light modules of the lighting device when a method according to the invention is used.

Since the total amount of current for the first light module (measured until the first preliminary derating time) is lower than in the case of FIG. 2, the derating time will be higher than the first preliminary derating time, as will be shown in FIG. 6.

Figure 5:
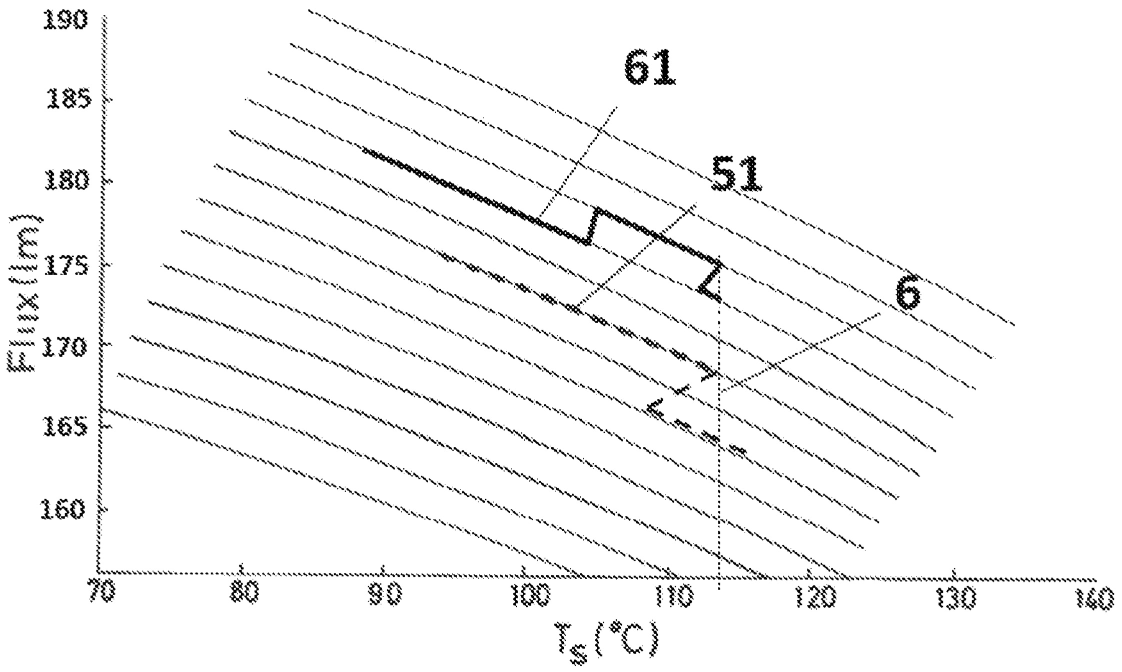
FIG. 5 shows this comparison for the second light module.

FIG. 5 shows this comparison for the second light module. Here, curve 51 represents the method of the state of the art and curve 61 represents the present invention. As has been previously announced, curve 61 represents higher current values than in the case of FIG. 2, which lead to a higher total amount of current.

FIG. 6 shows the new graphic scheme of the operation of the two light modules of the lighting device when a method according to the invention is used.

Curves 11' and 12' show the new evolution of the temperature with time. In the event of the first module, it is slower than the curve 11. In the event of the second module, it is faster than curve 12.

As has been previously announced, the use of lower current values in the first light module, which involved a lower total amount of current, causes a derating time 21' which is higher than the first preliminary derating time. On the contrary, the use of higher values in the second light module, which involved a higher total amount of current, causes a derating time 22' which is lower than the second preliminary derating time. However, luminous flux homogeneity is maintained and the minimum derating time (the first one) has been enlarged

What is claimed is:

1. A method for operating an automotive lighting device including at least a first light module and a second light module, each one of the light modules including solid-state light sources, the method comprising:

providing a first preliminary current profile to feed the first light module so that the first light module produces a light flux greater than a first flux threshold value, calculating a first preliminary derating time associated to the first preliminary current profile, wherein the first preliminary current profile involves a first preliminary amount of current until the first preliminary derating time;

providing a second preliminary current profile to feed the second light module so that the second light module produces a light flux greater than a second flux threshold value calculating a second preliminary derating time associated to the second preliminary current profile, the second preliminary derating time being higher than the first preliminary derating time, wherein the second preliminary current profile involves a second preliminary amount of current until the second preliminary derating time;

feeding the first light module with a first current profile which provides a total amount of current lower than the first preliminary amount of current, calculated until the first preliminary derating time; and feeding the second light module with a second current profile which provides a total amount of current higher than the second preliminary amount of current, calculated until the second preliminary derating time.

2. The method according to claim 1, wherein the first current profile and the second current profile includes starting with a first current value and increasing the current value when a predetermined condition is reached.

3. The method according to claim 2, further comprising obtaining the first current value with a machine learning algorithm which obtains information from vehicle sensors.

4. The method according to claim 3, wherein the vehicle sensors include at least some of temperature sensors, a vehicle speed sensor, a geopositioning sensor and radar or lidar sensors.

5. The method according to claim 2, wherein the predetermined condition includes the fact that a measured luminous flux value falls below the corresponding flux threshold value.

6. The method according to claim 2, further comprising obtaining a light source temperature and wherein the predetermined condition includes the fact that the light source temperature reaches a predetermined value.

7. The method according to claim 2, wherein the predetermined condition includes the fact that a time limit has been reached.

8. The method according to claim 2, wherein increasing the current value includes increasing the current value from a first value to a second value, the second value being greater than the first value but lower than 1.1 times the first value.

9. The method according to claim 8, wherein increasing the current value includes increasing the current value from a first value to a second value, the second value being lower than 1.05 times the first value.

10. The method according to claim 9, wherein increasing the current value includes increasing the current value from a first value to a second value, the second value being lower than 1.03 times the first value.

11. The method according to claim 1, further comprising recording a sequence of current value increments for predetermined conditions.

12. The method according to claim 1, wherein the first light module is a low beam module and the second light module is a high beam module.

13. The method according to claim 1, wherein the method is applied to at least 10% of the light sources of the corresponding light module.

14. An automotive lighting device comprising:

a first light module comprising a plurality of solid-state light sources;

a second light module comprising a plurality of solid-state light sources; and a control element configured to provide a first preliminary current profile to feed the first light module so that the first light module produces a light flux greater than a first flux threshold value, calculate a first preliminary derating time associated to the first preliminary current profile, wherein the first preliminary current profile involves a first preliminary amount of current until the first preliminary derating time;

provide a second preliminary current profile to feed the second light module so that the second light module produces a light flux greater than a second flux threshold value calculate a second preliminary derating time associated to the second preliminary current profile, the second preliminary derating time being higher than the first preliminary derating time, wherein the second preliminary current profile involves a second preliminary amount of current until the second preliminary derating time;

feed the first light module with a first current profile which provides a total amount of current lower than the first preliminary amount of current, calculated until the first preliminary derating time; and feed the second light module with a second current profile which provides a total amount of current higher than the second preliminary amount of current, calculated until the second preliminary derating time.

15. The automotive lighting device according to claim 14, further comprising a thermistor to measure the temperature of the solid-state light sources.

* * * * *